(12) United States Patent
Kluth et al.

(10) Patent No.: US 6,795,302 B2
(45) Date of Patent: *Sep. 21, 2004

(54) METHOD AND SYSTEM TO DETERMINE EXTERNAL POWER AVAILABLE AND FAULT STATES

(75) Inventors: Michael Robert Kluth, Austin, TX (US); Christian L. Critz, Georgetown, TX (US)

(73) Assignee: Dell Products L.P., Round Rock, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 10/442,025

(22) Filed: May 20, 2003

(65) Prior Publication Data

US 2004/0008462 A1 Jan. 15, 2004

Related U.S. Application Data

(63) Continuation of application No. 10/143,262, filed on May 10, 2002, now Pat. No. 6,597,565.

(51) Int. Cl.[7] .............................. H05K 5/00; H02J 7/00
(52) U.S. Cl. ........................................ 361/679; 320/128
(58) Field of Search ........................... 320/128; 702/57, 702/60–62, 65, 68, 120, 122, 116–117, 183; 361/562; 710/100, 303, 62; 307/64

(56) References Cited

U.S. PATENT DOCUMENTS

| | | | | |
|---|---|---|---|---|
| 5,557,738 A | * | 9/1996 | Townsley et al. .............. 307/66 |
| 5,838,982 A | | 11/1998 | Cooper et al. .............. 713/300 |
| 5,963,015 A | | 10/1999 | Lee .............................. 320/128 |
| 6,119,237 A | | 9/2000 | Cho .......................... 713/300 |
| 6,222,347 B1 | * | 4/2001 | Gong .......................... 320/137 |
| 6,274,949 B1 | * | 8/2001 | Lioux et al. .................. 307/64 |
| 6,278,598 B1 | | 8/2001 | Suzuki et al. .............. 361/93.9 |
| 6,360,177 B1 | | 3/2002 | Curt et al. ..................... 702/64 |

* cited by examiner

Primary Examiner—Pia Tibbits
(74) Attorney, Agent, or Firm—Hamilton & Terrile, LLP; Robert W. Holland

(57) ABSTRACT

A method and system determines the status of an external power supply connection to an information handling system. A subsystem manager of the information handling system compares an external power source identification signal and a power available signal to determine whether external power is available, unavailable or faulty. For instance, an information handling system configured as a portable computer receives external power from an AC/DC converter along with an identification signal for the converter. A state machine running on the portable computer system's Super I/O compares the identification signal and a power available signal from an internal charger to determine state of the external power source and indicate the state to a user.

11 Claims, 3 Drawing Sheets

METHOD AND SYSTEM TO DETERMINE EXTERNAL POWER AVAILABLE AND FAULT STATES

This application is a continuation of U.S. patent application Ser. No. 10/143,262, entitled "Method and System to Determine External Power Available and Fault States," filed May 10, 2002, now U.S. Pat. No. 6,597,565, issued Jul. 22, 2003.

BACKGROUND OF THE INVENTION

1. Field of the Invention

The present invention relates to the field of information handling systems, and more particularly to a method and system for determining external power available and fault states.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems configured as portable computers have grown increasingly favored by businesses and individuals due to the increased flexibility of their use. Portable computers typically include a battery to power components so that the portable computer may be carried and used independent of fixed power sources. Although internal power sources provide greater flexibility, they typically have a limited duration and need periodic recharging. If portable computers are not recharged before the battery discharges completely, the portable computer may shutdown resulting in a loss of active data and an inability by the user to turn the portable computer system on again unless an external power source is connected. Thus, when a user grows low on battery charge, the user is typically provided notice of the low battery charge and urged to connect to an external power source.

One difficulty with portable computers is that a failed external power source may make a portable computer with a discharged battery unusable. If a user connects a failed external power source expecting to recharge the battery, the failure of the portable computer once the battery discharges will come as an unpleasant surprise. To provide notice of external power source operability, AC adapters sometimes include an LED light to indicate operation. However, these indicators do not confirm that current passes from the adapter through the adapter cable to the portable computer power adapter connection. For instance, a broken cable between the adapter and the adapter connection will fail to recharge the portable computer even if the adapter LED indicates good operations. Further, the portable computer has no indication of a power adapter connection in situations when no power is provided by the adapter and portable computer charger interfaced with the adapter.

SUMMARY OF THE INVENTION

Therefore a need has arisen for a method and system which determines a faulty external power state for an information handling system, such as with a broken external power cable.

A further need exists for a method and system which determines an external power state for a connection of the external power to the information handling system whether or not the connection provides power to the information handling system.

In accordance with the present invention, a system and method are provided which substantially reduces the problems and disadvantages associated with providing external power to an information handling system. An external power source identification signal provided from the external power source and an external power available signal are compared to determine an external power source state. An external power source fault is determined if the external power source identification and the external power source available signals are inconsistent.

More specifically, an information handling system configured as a portable computer has an external power source connector that connects to the DC power cable of an AC adapter and also connects to an identification signal wire from the AC adapter. The DC signal passes to an internal charger or other power supply which provides power to run the portable computer and recharge the battery of the portable computer. The charger provides an external power available signal to a subsystem manager, such as a Super I/O processor, when it receives power for use by the portable computer. The identification signal passes to the subsystem manager to allow identification of the type of external power source.

An external power state machine operates on the subsystem manager to determine the state of the external power source. If inconsistent power available and identification signals are sensed, the external power state machine determines an external power fault state. For instance, if the power available signal indicates no external power and the identification signal indicates an external power source, an external power fault state is determined. If the power available signal indicates an external power source and the identification signal indicates no external power source, an external power source fault state is determined. If both the identification and the power available signals indicate an external power source, an external power available state is determined, such as that an adapter is connected to the portable computer. If both the identification and the power available signals indicate that no external power source is connected, the an external power disconnected state is determined, such as that an adapted is not connected to the portable computer. The external power state is provided to the user, such as with LED indicators, an audible indicator or a display window.

The present invention provides a number of important technical advantages. One example of an important technical advantage is that an external power fault state is automatically determined and provided to the user of an information handling system. For instance, an external power system fault associated with a broken cable between the power adapter and the information handling system connector is detected with notice provided to the user. Trouble shooting external power source faults is simplified and more accurate.

Another example of an important technical advantage is that external power source states are determined and provided to information handling system users. For instance, detection of an AC adapter to a portable computer is made so that a portable computer user may be notified of the connection. Determination of specific external power source states allows notification to users of specific states through a display of a portable computer, such as with an operating system message.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Information handling systems operating on an internal power source, such as battery, will shutdown if the internal power source is depleted. An unexpected loss of power may occur if an external power source fails and internal power is unwittingly depleted. The present invention provides notice and debugging for connections and faults of external power systems that power or recharge an information handling systems. For purposes of this application, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
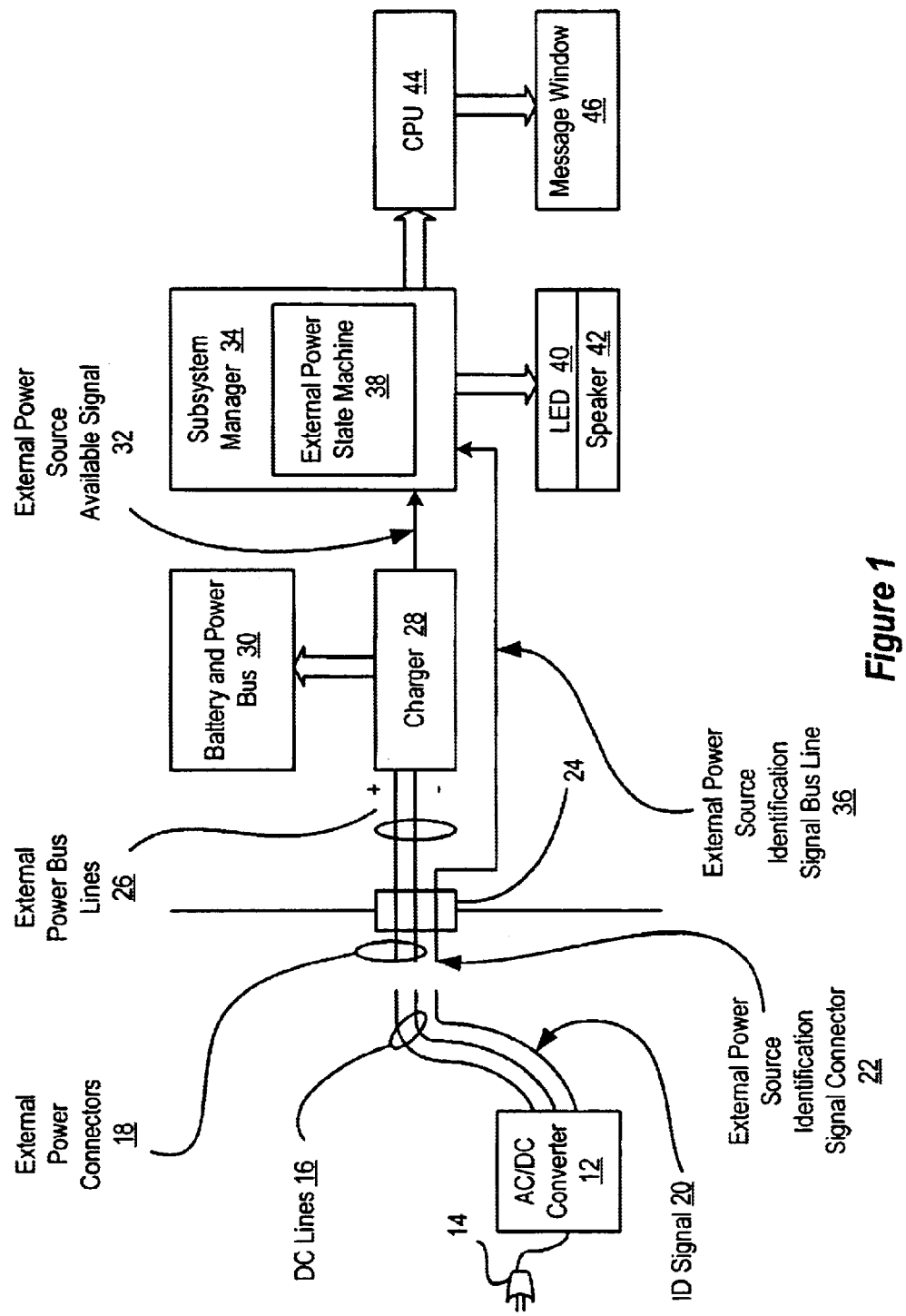
FIG. 1 depicts a block diagram of a portable computer information handling systems configured to determine external power states.

Referring now to FIG. 1, a block diagram depicts a system for determining the status of an external power system that provides power to an information handling system 10. An external power system 12 includes an AC/DC converter that accepts alternating current from a plug 14 and converts the alternating current into direct current. Two direct current lines 16 carry a positive and negative direct current power signal to two external power connector pins 18 integrated with information handling system 10. An external power source identification signal line 20 carries an external power source identification signal generated by external power source 12 to an external power source identification signal connector pin 22 integrated with information handling system 10. For instance, a microchip operating on external power source 12 provides a signal to identify the type of external power source. As an example embodiment, information handling system 10 is configured as a portable computer that incorporates an external power connector 24 to accept direct current power and an identification signal from external power source 12.

External power connector 24 provides external power and identification signals to information handling system 10 bus lines. The DC power signal proceeds from external power connector pins 18 across external power bus lines 26 to a charger 28. Charger 28 regulates power flow for use by battery and power bus 30 to power information handling system 10 and recharge internal power source batteries. For instance, charger 28 may act as power supply circuit that regulates power use by information handling system 10, such as by selecting internal or external power sources. Charger 28 outputs an external power source available signal through an external power source available signal bus line 32 to a subsystem manager 34 to indicate if external power is available to the information handling system. The external power source identification signal proceeds from external power source identification signal connector pin 22 through an external power source identification signal bus line 36 to subsystem manager 34 to allow the identification of the type of power source by subsystem manager 34.

Subsystem manager 34 is, for instance, a Super I/O processor that manages information subsystem operation, such as a Super I/O processor available from Silicon Microsystem Corporation. An external power state machine 38 operates on subsystem manager 34 to determine the status of external power for information handling system 10. For instance, external power state machine 38 operates as a software module with instructions to compare the external power source identification signal and the external power source available signal to determine that external power is available, not available or faulty. An external power available state is determined if the external power source identification signal indicates that an identified external power source is connected to connector 24 and the external power source available signal indicates that power is available from charger 28. An external power unavailable state is determined if the external power source identification signal indicates no identification and the external power source available signal indicates that external power is not available from charger 28. An external power fault state is indicated if the external power source identification signal and the external power available signal are inconsistent. For instance, an external power state fault is determined if one of the external power source identification and external power source available signals indicate the presence of an external power state and the other does not.

Subsystem manager 34 communicates with various information handling system components to provide notice of external power source states to users. For instance, an external power state fault may be indicated by a signal from subsystem manager 34 to LEDs 40 to display a fault indication of to speaker 42 to sound an audible alarm. Similarly, LEDs 40 may indicate external power available and external power unavailable states, such as by illuminating a charge LED if an external power available state is determined or flashing the charge LED when a change in state to external power unavailable is determined. Alternatively, subsystem manager 34 may provide a system management interrupt (SMI) to CPU 44 to trigger the display of a message window 46 indicating the external power state. Message window 46 may help to logically debug a broken external power cable by indicating the location of the fault in a visible message to the user.

Figure 2:
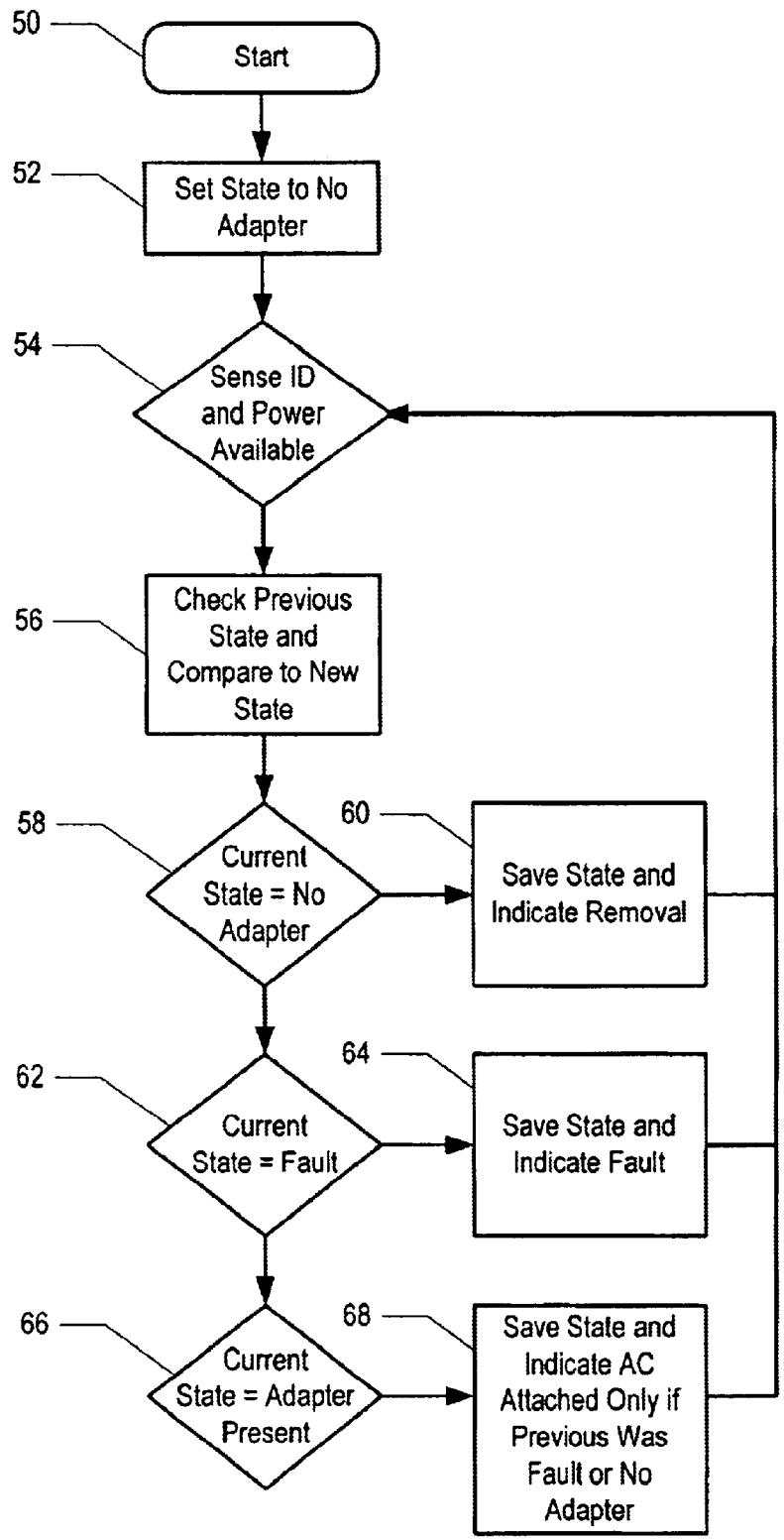
FIG. 2 depicts a flow diagram for determining external power states and indicating the external power states to a user.

Referring now to FIG. 2, a flow diagram depicts a process for the external power state machine to determine an external power state. The process starts at step 50, such as with power up of the information handling system, and proceeds to step 52, at which the external power state is initialized to a no external power state with no external power adapter interfaced with the information handling system. At step 54, the external power identification signal is pinged for connection by polling the identification chip of the external power supply and the power available status signal provided by the charger is taken. The specific communications are determined by the previous and current external power states.

Figure 3:
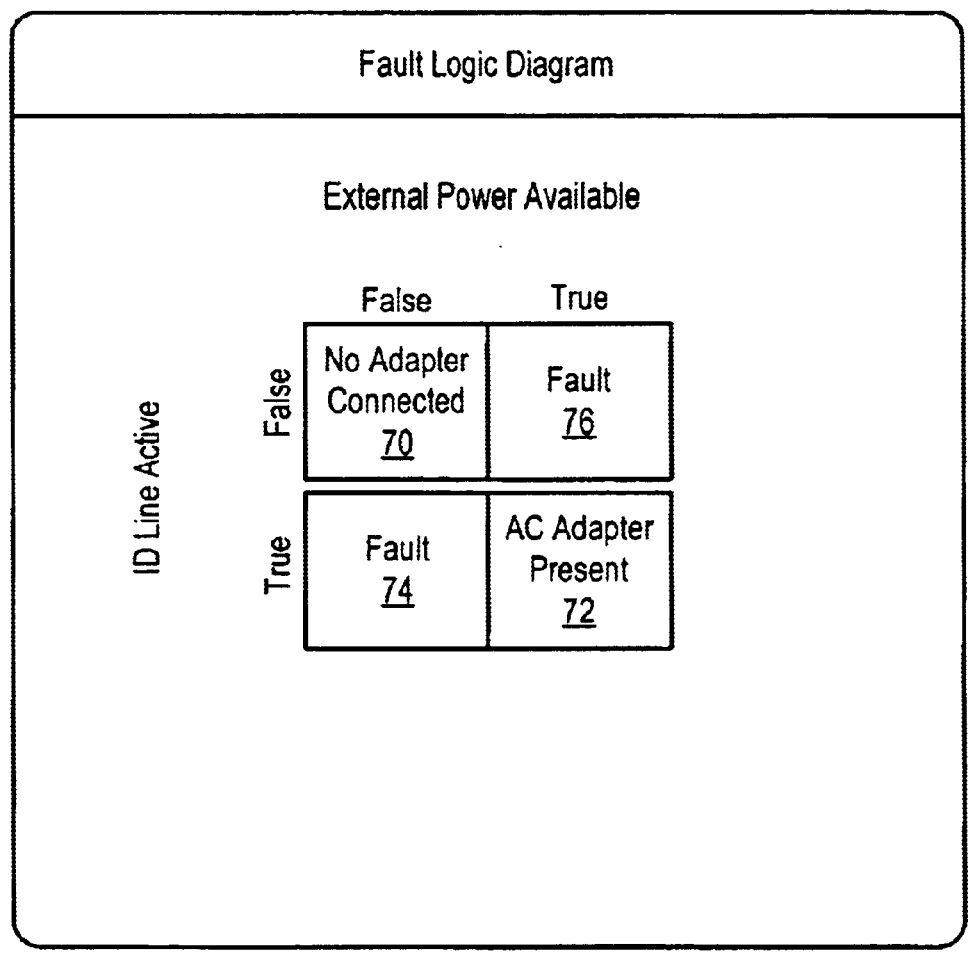
FIG. 3 depicts a truth table for determining external power states with external power identification and available signals.

At step 56, the previous state is compared against the current state to determine if a change in state has occurred. If, for instance a change in state has occurred, notification to the user of a change in state may be appropriate. A truth table for determining external power states is depicted by FIG. 3. At entry 70, the ID line active state is false and the external power available state is false, indicating an external power unavailable state, such as that no power adapter is connected. At entry 70, the ID line active state is true and the external power available state is true, indicating an external power available state, such as that a power adapter is connected. At entries 74 and 76, the ID line active state and external power state are inconsistent with one indicating true and the other false, thus indicating an external power fault state.

The process proceeds to step 58 where a determination is made of whether the current state is an external power unavailable state, such as if no external power adapter is detected at entry 70 of the truth table depicted by FIG. 3. If yes, then at step 60, the external power unavailable state is saved and removal of the external power source is indicated, and the process returns to step 54. If the determination of step 58 is no, the process proceeds to step 62 to determine if the current state is a fault state, such as with entries 74 and 76 of the truth table depicted by FIG. 3. If yes, then at step 64 the fault state is saved and a faulty external power source is indicated, and the process returns to step 54. If the determination of step 62 is no, the process proceeds to step 66 to determine if the current state is an external power available state, such as with entry 72 of the truth table depicted by FIG. 3 in which an external power source adapter is connected. The process proceeds to step 68 to save the power available state and indicate that external power, such as an AC/DC converter, is connected if the previous state was a fault or external power not available state. In alternative embodiments, notification of states may be provided by LED indications, audible alarms or pop-up screen or operating system messages, with indications made dependent upon user needs.

Although the present invention has been described in detail, it should be understood that various changes, substitutions and alterations can be made hereto without departing from the spirit and scope of the invention as defined by the appended claims.

What is claimed is:

1. A system for monitoring the state of an external power source provided to an information handling system, the system comprising:

a power connector integrated with the information handling system, the power connector having an external power connection and an external power source identification signal connection;

a charger interfaced with the external power connection, the charger providing power to the information handling system, the charger outputting an external power available signal if power is received from the power connector; and a subsystem manager interfaced with the external power source identification signal connection and the power available signal of the charger to determine an external power source state as an external power present, an external power disconnected state or an external power fault state.

2. The system of claim 1 further comprising a state machine operable on the subsystem manager, the state machine sensing the external power source identification signal and the power available signal to determine the external power source state.

3. The system of claim 2 wherein the state machine determines an external power source fault state if the external power source identification signal indicates an external power source connection and the power available signal indicates external power not available.

4. The system of claim 2 wherein the state machine determines an external power source fault state if the external power source identification indicates no external power source connection and the power available signal indicates external power available.

5. The system of claim 2 wherein the subsystem manager communicates an external power fault state to the information handling system with a system management interrupt.

6. The system of claim 5 wherein the system management interrupt signals the information handling system to provide notification of an external power system failure.

7. The system of claim 1 further comprising an alternating current external power source operable to convert external alternating current to direct current, the external power source interfaced with the power connector to provide power to the external power connection and an external power source identification signal to the external power source identification signal connection.

8. An information handling system comprising:

a central processing unit operable to process information;

a battery operable to provide power to the central processing unit;

a charger interfaced with the battery, the charger operable to regulate external power flow to the battery and to output an external power available signal when receiving external power;

an external power connector interfaced with the charger to accept an external power flow from an external power source and an external power source identification signal; and a subsystem manager interfaced with the central processing unit, the external power available signal and the external power source identification signal, the subsystem manager operable to compare the external power available signal and the external power source identification signal to detect an external power source fault.

9. The information handling system of claim 8 wherein the subsystem manager is further operable to signal the central processing unit of an external power source fault detection.

10. The information handling system of claim 8 configured as a portable computer.

11. The information handling system of claim 8 wherein the subsystem manager is further operable to detect an external power source as present if both the external power source available signal and the external power source identification signal are present.

* * * * *